US012587069B2

(12) United States Patent

Stingl et al.

(10) Patent No.: US 12,587,069 B2

(45) Date of Patent: Mar. 24, 2026

(54) POWER TOOL BATTERY TERMINAL BLOCK ASSEMBLY

(71) Applicant: MILWAUKEE ELECTRIC TOOL CORPORATION, Brookfield, WI (US)

(72) Inventors: Spencer Stingl, Wauwatosa, WI (US); Jonathan J. Christian, Greenfield, WI (US); Alan J. Rehfeldt, Oak Creek, WI (US); Yong Zhang, Maoming (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/666,919

(22) Filed: May 17, 2024

(65) Prior Publication Data

US 2024/0388171 A1 Nov. 21, 2024

(30) Foreign Application Priority Data

May 19, 2023 (CN) .......................... 202321228878.1

(51) Int. Cl.
H01M 10/63 (2014.01)
B25D 16/00 (2006.01)
(Continued)

(52) U.S. Cl.
CPC .......... H02K 9/227 (2021.01); B25D 16/006 (2013.01); F04D 25/0673 (2013.01);
(Continued)

(58) Field of Classification Search
CPC .......... H02K 9/227; H02K 5/225; H02K 9/14;

H02K 13/10; H01M 19/613; H01M 19/6235; H01M 19/63; H01M 19/6551; H01M 19/6563; B25D 16/006; F04D 25/0673; F04D 25/06; H02J 7/0063
See application file for complete search history.

(56) References Cited

U.S. PATENT DOCUMENTS

| | | | |
|---|---|---|---|
| 6,455,186 | B1 | 9/2002 | Moores, Jr. et al. |
| 6,645,666 | B1 | 11/2003 | Moores, Jr. et al. |

(Continued)

FOREIGN PATENT DOCUMENTS

| | | |
|---|---|---|
| CN | 1989674 A | 6/2007 |
| CN | 202377571 U | 8/2012 |

(Continued)

OTHER PUBLICATIONS

US 7,811,699 B2, 10/2010, Sakakibara (withdrawn)

*Primary Examiner* — Nathaniel C Chukwurah

(74) *Attorney, Agent, or Firm* — Quarles & Brady LLP

(57) ABSTRACT

A power tool includes a motor configured to drive a working element and a battery receptacle. The battery receptacle is configured to receive a battery and includes a tool-side battery terminal, a tool-side terminal block, and a heat sink. The tool-side battery terminal is electrically coupled to the motor and configured to transfer electrical current from the battery to the motor. The tool-side terminal block is mounted to the tool-side battery terminal. The heat sink is in thermal communication with at least one of the tool-side terminal block or the tool-side battery terminal. The heat sink comprises a thermally conductive material configured to transfer heat away from the tool-side battery terminal.

21 Claims, 6 Drawing Sheets

(51) Int. Cl.

| | |
|---|---|
| *F04D 25/06* | (2006.01) |
| *F04D 25/08* | (2006.01) |
| *H01M 10/613* | (2014.01) |
| *H01M 10/6235* | (2014.01) |
| *H01M 10/6551* | (2014.01) |
| *H01M 10/6563* | (2014.01) |
| *H02J 7/00* | (2006.01) |
| *H02K 5/22* | (2006.01) |
| *H02K 9/22* | (2006.01) |

(52) U.S. Cl.

CPC .......... *F04D 25/08* (2013.01); *H01M 10/613* (2015.04); *H01M 10/6235* (2015.04); *H01M 10/63* (2015.04); *H01M 10/6551* (2015.04); *H01M 10/6563* (2015.04); *H02J 7/0063* (2013.01); *H02K 5/225* (2013.01); *B25D 2216/0084* (2013.01); *B25D 2250/095* (2013.01); *H01M 2220/30* (2013.01)

(56) References Cited

U.S. PATENT DOCUMENTS

| | | | |
|---|---|---|---|
| 6,949,309 B2 | 9/2005 | Moores, Jr. et al. | |
| 7,014,945 B2 | 3/2006 | Moores, Jr. et al. | |
| 7,056,616 B2 | 6/2006 | Moores, Jr. et al. | |
| 7,157,882 B2 | 1/2007 | Johnson et al. | |
| 7,157,883 B2 | 1/2007 | Johnson et al. | |
| 7,164,257 B2 | 1/2007 | Johnson et al. | |
| 7,176,654 B2 | 2/2007 | Meyer et al. | |
| 7,211,347 B2 * | 5/2007 | Sugiura ............. | H01M 10/6566 429/100 |
| 7,238,443 B2 | 7/2007 | Sakakibara | |
| 7,252,904 B2 | 8/2007 | Moores, Jr. et al. | |
| 7,253,585 B2 | 8/2007 | Johnson et al. | |
| 7,262,580 B2 | 8/2007 | Meyer et al. | |
| 7,321,219 B2 | 1/2008 | Meyer et al. | |
| 7,323,847 B2 | 1/2008 | Meyer et al. | |
| 7,326,490 B2 | 2/2008 | Moores, Jr. et al. | |
| 7,342,381 B2 | 3/2008 | Johnson et al. | |
| 7,382,945 B1 | 6/2008 | Sanders | |
| 7,425,816 B2 | 9/2008 | Meyer et al. | |
| 7,492,124 B2 | 2/2009 | Johnson et al. | |
| 7,504,804 B2 | 3/2009 | Johnson et al. | |
| 7,508,167 B2 | 3/2009 | Meyer et al. | |
| 7,554,290 B2 | 6/2009 | Johnson et al. | |
| 7,557,535 B2 | 7/2009 | Johnson et al. | |
| 7,572,547 B2 | 8/2009 | Sakakibara | |
| 7,589,500 B2 | 9/2009 | Johnson et al. | |
| 7,667,437 B2 | 2/2010 | Johnson et al. | |
| 7,714,538 B2 | 5/2010 | Johnson et al. | |
| 7,736,792 B2 | 6/2010 | Moores, Jr. et al. | |
| 7,791,318 B2 | 9/2010 | Johnson et al. | |
| 7,799,448 B2 | 9/2010 | Cruise et al. | |
| 7,879,483 B2 | 2/2011 | Sakakibara | |
| 7,939,193 B2 | 5/2011 | Moores, Jr. et al. | |
| 7,944,173 B2 | 5/2011 | Johnson et al. | |
| 7,944,181 B2 | 5/2011 | Johnson et al. | |
| 7,952,326 B2 | 5/2011 | Johnson et al. | |
| 7,969,116 B2 * | 6/2011 | Aradachi ............ | H01M 50/213 320/112 |
| 7,993,772 B2 | 8/2011 | Sakakibara | |
| 7,999,510 B2 | 8/2011 | Johnson et al. | |
| 8,018,198 B2 | 9/2011 | Meyer et al. | |
| 8,076,019 B2 | 12/2011 | Lohr et al. | |
| 8,097,354 B2 | 1/2012 | Sakakibara | |
| 8,154,249 B2 | 4/2012 | Johnson et al. | |
| 8,207,702 B2 | 6/2012 | Johnson et al. | |
| 8,228,036 B2 | 7/2012 | Meyer | |
| 8,269,459 B2 | 9/2012 | Johnson et al. | |
| 8,383,263 B2 | 2/2013 | Cruise et al. | |
| 8,426,051 B2 | 4/2013 | Sakakibara | |
| 8,436,584 B2 | 5/2013 | Johnson et al. | |
| 8,450,971 B2 | 5/2013 | Johnson et al. | |
| 8,471,532 B2 | 6/2013 | Johnson et al. | |
| 8,487,585 B2 | 7/2013 | Johnson et al. | |
| 8,525,479 B2 | 9/2013 | Meyer et al. | |
| 8,653,790 B2 | 2/2014 | Johnson et al. | |
| 8,703,320 B2 | 4/2014 | Sohn | |
| 8,741,467 B2 | 6/2014 | Sakakibara | |
| 8,822,067 B2 | 9/2014 | Johnson et al. | |
| 8,841,015 B2 | 9/2014 | Yoon | |
| 9,018,903 B2 | 4/2015 | Johnson et al. | |
| 9,048,515 B2 | 6/2015 | Johnson et al. | |
| 9,112,248 B2 | 8/2015 | Johnson et al. | |
| 9,118,189 B2 | 8/2015 | Meyer et al. | |
| 9,312,721 B2 | 4/2016 | Johnson et al. | |
| 9,368,842 B2 | 6/2016 | Johnson et al. | |
| 9,379,569 B2 | 6/2016 | Johnson et al. | |
| 9,614,387 B2 | 4/2017 | Cruise et al. | |
| 9,660,293 B2 | 5/2017 | Johnson et al. | |
| 9,673,648 B2 | 6/2017 | Johnson et al. | |
| 9,680,325 B2 | 6/2017 | Johnson et al. | |
| 9,793,583 B2 | 10/2017 | Johnson et al. | |
| 9,819,051 B2 | 11/2017 | Johnson et al. | |
| 9,912,020 B2 | 3/2018 | Glasgow et al. | |
| 9,941,718 B2 | 4/2018 | Johnson et al. | |
| 9,954,418 B2 | 4/2018 | Kawakami et al. | |
| 10,008,864 B2 | 6/2018 | Meyer et al. | |
| 10,097,026 B2 | 10/2018 | Johnson et al. | |
| 10,141,614 B2 | 11/2018 | Johnson et al. | |
| 10,218,194 B2 | 2/2019 | Johnson et al. | |
| 10,224,566 B2 | 3/2019 | Johnson et al. | |
| 10,374,443 B2 | 8/2019 | Meyer et al. | |
| 10,431,857 B2 | 10/2019 | Johnson et al. | |
| 10,536,022 B2 | 1/2020 | Johnson et al. | |
| 10,566,810 B2 | 2/2020 | Johnson et al. | |
| 10,593,991 B2 | 3/2020 | Johnson et al. | |
| 10,674,618 B2 | 6/2020 | Choksi et al. | |
| 10,714,948 B2 | 7/2020 | Meyer et al. | |
| 10,811,937 B2 | 10/2020 | Kawakami et al. | |
| 10,862,327 B2 | 12/2020 | Johnson et al. | |
| 10,886,762 B2 | 1/2021 | Johnson et al. | |
| 10,998,586 B2 | 5/2021 | Johnson et al. | |
| 11,063,446 B2 | 7/2021 | Meyer et al. | |
| 11,139,529 B2 | 10/2021 | Yoon et al. | |
| 11,179,824 B2 | 11/2021 | Kondo | |
| 11,196,080 B2 | 12/2021 | Johnson et al. | |
| 11,303,067 B2 | 4/2022 | Cruise et al. | |
| 11,469,608 B2 | 10/2022 | Johnson et al. | |
| 2003/0186114 A1 | 10/2003 | Lohr et al. | |
| 2004/0001223 A1 | 1/2004 | Tanaka | |
| 2006/0117580 A1 | 6/2006 | Serdynski et al. | |
| 2008/0170841 A1 * | 7/2008 | Schneider ............. | H02K 29/08 388/800 |
| 2009/0145621 A1 * | 6/2009 | Lau ........................ | B25F 5/008 173/171 |
| 2011/0253402 A1 | 10/2011 | Aradachi et al. | |
| 2013/0224527 A1 | 8/2013 | Johnson et al. | |
| 2013/0244504 A1 | 9/2013 | Ogura | |
| 2014/0131059 A1 * | 5/2014 | Verbrugge ................ | B25F 5/02 173/217 |
| 2014/0272516 A1 | 9/2014 | Tennison et al. | |
| 2015/0340887 A1 | 11/2015 | Meyer et al. | |
| 2017/0013740 A1 * | 1/2017 | Mergener ............... | H02K 9/227 |
| 2018/0104811 A1 | 4/2018 | Meixner et al. | |
| 2018/0342928 A1 * | 11/2018 | Ekstrom ................ | B25F 5/008 |
| 2018/0369939 A1 * | 12/2018 | Zimmerman .......... | B23D 61/02 |
| 2019/0273421 A1 * | 9/2019 | Velderman ........... | H02K 11/215 |
| 2020/0227927 A1 * | 7/2020 | Thiele ................... | H04W 4/029 |
| 2020/0288588 A1 | 9/2020 | Choksi et al. | |
| 2020/0376644 A1 | 12/2020 | Schneider et al. | |
| 2021/0126476 A1 | 4/2021 | Johnson et al. | |
| 2021/0265676 A1 | 8/2021 | Johnson et al. | |
| 2021/0336450 A1 | 10/2021 | Meyer et al. | |
| 2022/0093965 A1 | 3/2022 | Johnson et al. | |
| 2022/0271624 A1 | 8/2022 | Wang et al. | |
| 2023/0398614 A1 * | 12/2023 | Vandenbush .......... | B23D 59/02 |

FOREIGN PATENT DOCUMENTS

| | | |
|---|---|---|
| CN | 110653766 A | 1/2020 |
| CN | 213471501 U | 6/2021 |
| GB | 2396755 A | 6/2004 |

(56) References Cited

FOREIGN PATENT DOCUMENTS

| | | | |
|---|---|---|---|
| GB | 2399701 | A | 9/2004 |
| GB | 2408396 | A | 5/2005 |
| GB | 2420027 | A | 5/2006 |
| GB | 2434264 | A | 7/2007 |
| JP | 2006142436 | A | 6/2006 |
| WO | 2005117231 | A1 | 12/2005 |

* cited by examiner

POWER TOOL BATTERY TERMINAL BLOCK ASSEMBLY

FIELD OF THE INVENTION

The present invention relates to power tools, and more particularly to battery terminal block assemblies of power tools.

BACKGROUND OF THE INVENTION

Power tools such as, for instance, rotary hammers, receive power from portable battery packs. Electrical terminals of the battery packs are coupled mechanically with corresponding terminals of the power tool to transmit power from the battery pack to the power tool. Electrical current is passed through the electrical terminals of the battery packs and the electrical terminals of the power tool. This electric current generates heat. Heat generated increases as supplied current increases.

SUMMARY OF THE INVENTION

The invention provides, in one aspect, a power tool including a motor configured to drive a working element and a battery receptacle. The battery receptacle is configured to receive a battery and includes a tool-side battery terminal, a tool-side terminal block, and a heat sink. The tool-side battery terminal is electrically coupled to the motor and is configured to transfer electrical current from the battery to the motor. The tool-side battery terminal is mounted to the tool-side terminal block. The heat sink is in thermal communication with at least one of the tool-side terminal block or the tool-side battery terminal. The heat sink comprises a thermally conductive material configured to transfer heat away from the tool-side battery terminal.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
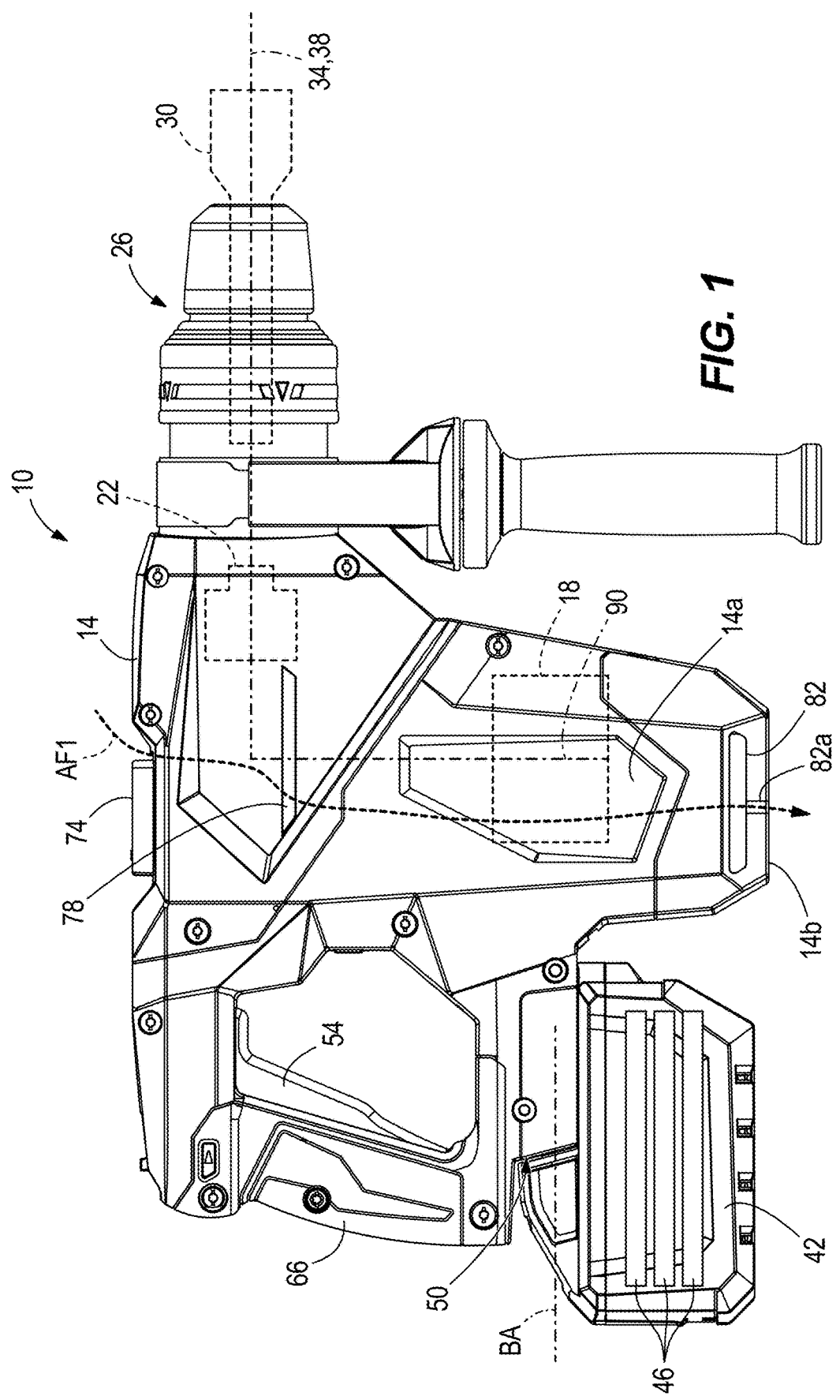
FIG. 1 is a side view of a rotary hammer.
Figure 2:
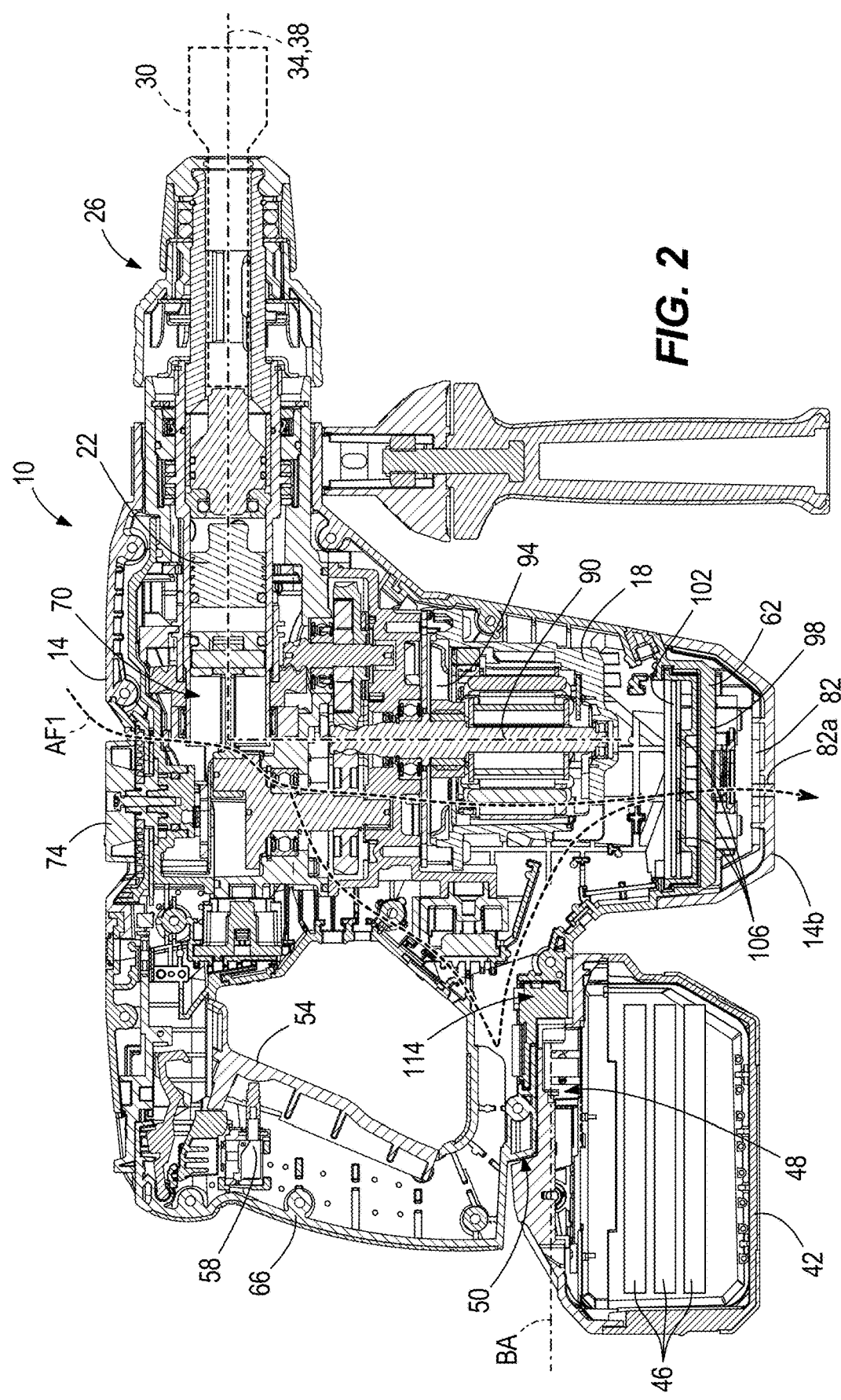
FIG. 2 is a longitudinal cross-sectional view of the rotary hammer of FIG. 1.

FIGS. 1 and 2 illustrate a reciprocating percussive power tool, such as a rotary hammer 10, according to an embodiment of the invention. The rotary hammer 10 includes a housing 14, a motor 18 disposed within the housing 14, and a rotatable spindle 22 coupled to the motor 18 for receiving torque from the motor 18. In the illustrated embodiment, the rotary hammer 10 includes a quick-release mechanism 26 coupled for co-rotation with the spindle 22 to facilitate quick removal and replacement of a tool bit 30. The rotary hammer 10 defines a tool bit axis 34, which in the illustrated embodiment, is coaxial with a rotational axis 38 of the spindle 22.

In the illustrated embodiment, the motor 18 is configured as a brushless direct current (BLDC) motor that receives power from a power source 42 (e.g., a battery) which is selectively coupled to the rotary hammer 10. The battery 42 may include any of a number of different nominal voltages (e.g., 12V, 18V, etc.), and may be configured having any of a number of different chemistries (e.g., lithium-ion, nickel-cadmium, etc.). In some embodiments, the battery 42 is a battery pack 42 including a plurality of battery cells 46. The battery cells 46 may be cylindrical cells, pouch cells, button cells, prismatic cells, or any other type of battery cell. Each battery cell 46 of the battery pack 42 may be physically oriented within the battery pack 42 in any suitable arrangement. For example, the battery pack 42 illustrates battery cells 46 (e.g., pouch cells) oriented in a direction parallel to the bit axis 34 where the battery pack 42 is coupled to the rotary hammer 10. In other embodiments, battery cells 46 (e.g., cylindrical cells) may be oriented parallel to the drive train 70 when the battery pack 42 is coupled to the rotary hammer 10. The battery cells 46 may be electrically coupled to one another in any series, parallel, or other electrical arrangement. Terminals of the battery cells 46 may be electrically coupled with battery terminals 48 configured to be removably coupled to a battery receptacle 50 of the housing 14. The battery terminals 48 are dimensioned and made of electrically conductive material such that the battery terminals 48 can pass current (e.g., power) from the battery pack 42 to the rotary hammer 10 via the battery receptacle 50.

The motor 18 is selectively activated by depressing an actuating member, such as a trigger 54, which in turn actuates an electrical switch 58. The switch 58 is electrically connected to the motor 18 via an electronic control unit 62 (i.e., PCBA 62; including, for example, a microprocessor and/or one or more circuits) for controlling operation of the motor 18. In the illustrated embodiment, the trigger 54 is positioned adjacent a handle 66 of the rotary hammer 10, and the electrical switch 58 is positioned within the handle 66.

The rotary hammer 10 further includes a drive train 70 which selectively provides axial and/or rotational movement of the tool bit 30 based on the position of a mode selection dial 74. The mode selection dial 74 is movable (e.g., rotatable) by an operator to switch between various positions corresponding with various operating modes of the rotary hammer 10. In a "combined hammer and drilling" mode, the motor 18 is drivably coupled to the drive train 70 such that the rotary hammer 10 is configured to axially and rotationally move the tool bit 30. In a "hammer-only" mode (i.e., "chisel" mode), the motor 18 is drivingly coupled to the drive train 70 for reciprocation while the spindle 22 is not rotated by the motor 18. In other words, in the "hammer-only" mode (i.e., "chisel" mode), the rotary hammer 10 is configured to axially move the tool bit 30. In a "drill-only" mode, the motor 18 is drivingly coupled to the spindle 22 for rotation, while the drive train 70 is not driven by the motor 18. In other words, in the "drill-only" mode, the rotary hammer 10 is configured to rotationally move the tool bit 30. In a "chisel adjustment mode" (i.e., "hammer adjustment mode"), the spindle 22 is unlocked from the motor 18, and the spindle 22 is permitted to freely rotate within the housing 14 such that a user may adjust (e.g., move) the orientation of the spindle 22 and thus the tool bit 30 to a desired orientation. In other rotary hammers 10, more or fewer operating modes may be possible.

In power tools other than rotary hammers 10, the drive train 70 may be replaced with different types of drive trains permitting different movement of different working elements (e.g., the tool bit 30).

As shown in FIG. 1, the housing 14 includes an inlet opening 78 in at least one side surface 14a thereof (e.g., a right side, closest to the viewer as viewing FIG. 1, and a left side, furthest from the viewer as viewing FIG. 1). In the illustrated embodiment, the inlet opening 78 is positioned between the motor 18 and the mode selection dial 74. However, in other embodiments, the inlet opening 78 may be otherwise positioned upstream of the motor 18. The housing 14 further includes a plurality of exhaust openings 82 positioned at the bottom of the housing 14. In the illustrated embodiment, the exhaust openings 82 are provided in a sidewall of the housing 14. Additionally or alternatively, exhaust openings 82a may be provided in an axial end wall 14b of the housing 14. In other embodiments, the exhaust openings 82 may be otherwise positioned downstream of at least the motor 18, and preferably downstream of both the motor 18 and the PCBA 62. For example, the exhaust openings 82 may be positioned adjacent a bottom surface 86 of the housing 14, but exhaust air in a direction perpendicular to a rotational axis 90 of the motor 18 and into and/or out of the page as viewed in FIG. 1. For context, the axial end wall 14b of the housing 14 including the exhaust openings 82a is positioned at an axial end of the housing 14 relative to the rotational axis 90. In the illustrated embodiment, the PCBA 62 is positioned between the motor 18 and the exhaust openings 82.

With continued reference to FIG. 1, the motor 18 is coupled to a motor fan 94, which generates an airflow AF1 (e.g., a first airflow) through (e.g., within) the housing 14 in response to rotation of the motor 18. During operation of the rotary hammer 10, the motor 18 and the PCBA 62 generate heat. The airflow induced by the motor fan 94 passes through the inlet opening 78, through and around the motor 18, and around the PCBA 62, thereby transferring heat from the motor 18 and the PCBA 62 to the airflow. The heated airflow is then exhausted from the housing 14 via the exhaust openings 82.

As illustrated in FIG. 2, the PCBA 62 includes a potting boat 98 which may be at least partially made of a thermally conductive material (e.g., Aluminum, Copper, etc.), and may include at least one heat sink fin. The PCBA 62 further includes a printed circuit board (PCB) 102 positioned at least partially within the potting boat 98. Heat-generating electronic components (e.g., a microprocessor, field effect transistors or FETs 106, etc.) are mounted on the PCB 102. The PCBA 62 may include a plurality (e.g., six) FETs 106 mounted on the PCB 102 and configured to control the supply of electrical current to the motor 18 from the battery pack 42. The FETs 106 are switched on and off in rapid succession during operation of the motor 18. Rapid switching of the FETs 106 generates heat. In some exemplary embodiments, the FETs 106 may be mounted to the PCB 102 in an H-bridge motor driver circuit. Heat generated by the FETs 106 is transferred into the potting boat 98. Heat generated by the FETs 106 may be conducted through the potting boat 98 and into the airflow induced by the motor fan 94. As the airflow passes the PCBA 62, heat is transferred from the PCBA 62 to the airflow via convection, and the heat is carried by the airflow through the exhaust openings 82 to the surroundings of the rotary hammer 10.

Figures 3, 4, 5:
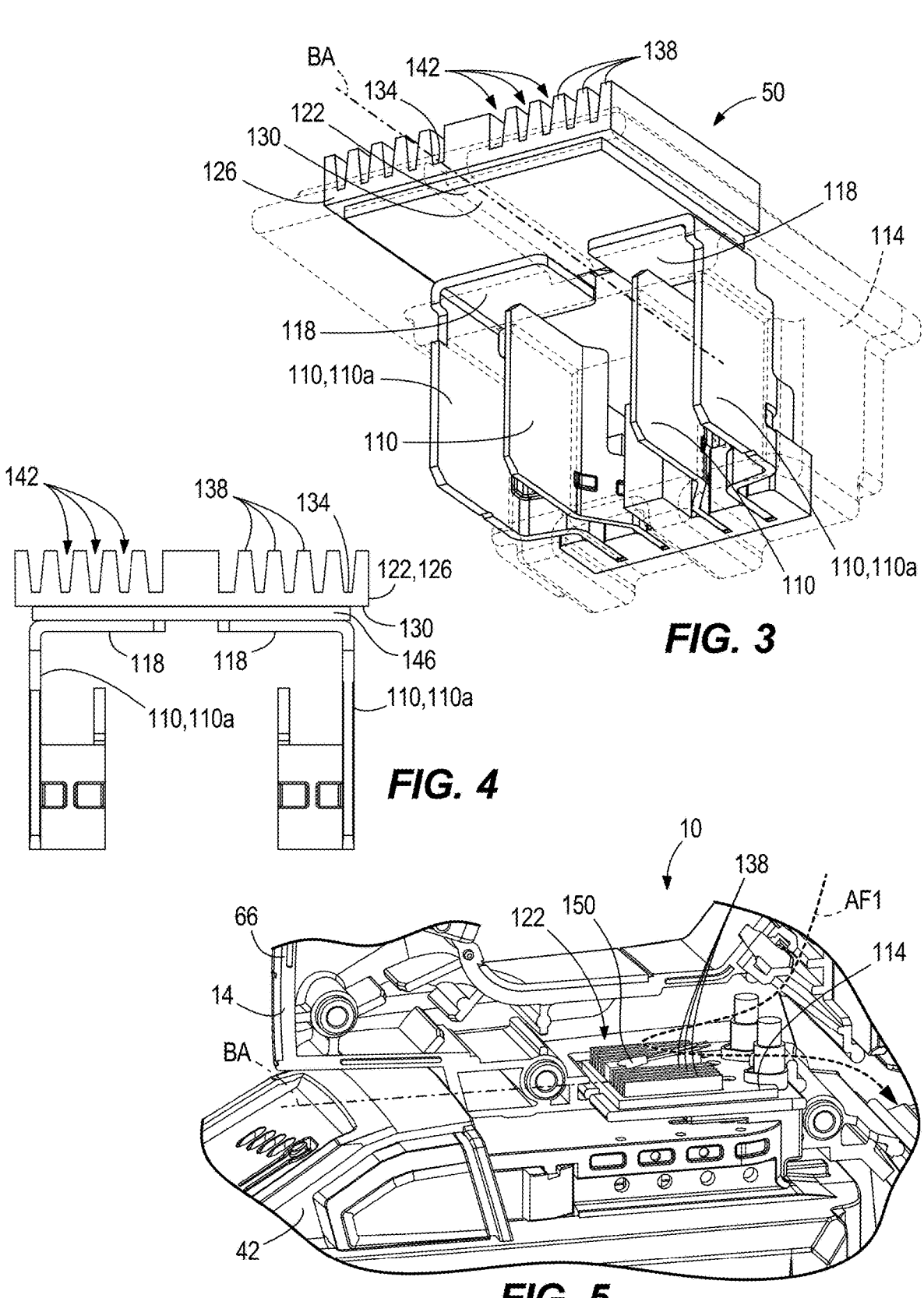
FIG. 3 is a perspective view of a terminal block of the rotary hammer of FIG. 1.
FIG. 4 is an end view of the terminal block of FIG. 3.
FIG. 5 is a perspective view of a rotary hammer including a temperature sensor.

FIG. 3 illustrates the battery receptacle 50 in detail. The battery receptacle 50 is configured to receive the battery pack 42 and to mechanically couple and electrically couple the battery pack 42 to the rotary hammer 10. In the illustrated embodiment, the battery pack 42 is configured to be coupled to the battery receptacle 50 by relative translation of the battery pack 42 along a battery axis BA. In the illustrated embodiment, the battery axis BA extends in parallel with the tool bit axis 34. The battery receptacle 50 includes a plurality of tool-side battery terminals 110. The tool-side battery terminals 110 are dimensioned and made of electrically conductive material such that the battery terminals 48 can transfer electrical current from the battery pack 42 through the battery terminals 48 and the tool-side battery terminals 110, and to the motor 18. In the illustrated embodiment, the battery receptacle 50 includes four tool-side battery terminals 110. At least two of the tool-side battery terminals 110 (also demarcated with reference numeral 110a) correspond with positive and negative electrodes of the battery pack 42. At least these two tool-side battery terminals 110 are configured to be electrically coupled to the motor 18 and to pass current from the battery pack 42 to the motor. The remaining tool-side battery terminals 110 may provide electrical communication for signal(s), ground, and the like. Optionally, any of the tool-side battery terminals 110 may be in electrical communication with (e.g., power and/or signal electrical communication) the PCBA 62. In other embodiments, different numbers of tool-side battery terminals are possible. The tool-side battery terminals 110 are retained (e.g., supported, held in place) by a tool-side terminal block 114. The tool-side terminal block (e.g., terminal block) 114 is made of an electrically insulative material. As illustrated in FIG. 5, the tool-side terminal block 114 is secured to the housing 14. The tool-side battery terminals 110 (e.g., the tool-side battery terminals 110a) corresponding with the positive and negative electrodes of the battery pack 42 protrude through the tool-side terminal block 114 and include folded portions 118. In the illustrated embodiment in FIGS. 3 and 4, the folded portions 118 are folded in a laterally inward direction towards a center of the tool-side terminal block 114 with the folded portion 118 of one tool-side battery terminal 110a facing the folded portion 118 of the other tool-side battery terminal 110a. However, in other embodiments, the tool-side battery terminals 110 may be otherwise folded. The battery receptacle 50 further includes a heat sink 122 in thermal communication with at least one of the tool-side terminal block 114 or the tool-side battery terminal 110. The heat sink 122 is positioned within the housing 14.

The heat sink 122 includes a body 126 having a bottom surface 130 and an oppositely facing top surface 134. The heat sink 122 includes a plurality of heat sink fins 138 projecting from the top surface 134 of the body 126. In the illustrated embodiment, the heat sink fins 138 are extrusions which are generally tapered rectangles in cross-section. In other embodiments, the heat sink fins 138 may be otherwise shaped (e.g., pin-shaped fins, heat sink fins with other extruded cross-sectional shapes, etc.). In the illustrated embodiment, airflow channels 142 are defined between adjacent heat sink fins 138. In the illustrated embodiment, the bottom surface 130 of the body 126 is in thermal communication with two of the tool-side battery terminals 110 (e.g., the tool-side battery terminals 110a). In other embodiments, any portion of the heat sink 122 may be in thermal communication with one or more of the tool-side battery terminals 110. In the embodiment illustrated in FIG. 3, the folded portions 118 of two of the tool-side battery terminals 110 are in mechanical contact with the bottom surface 130 of the heat sink 122.

As illustrated in FIG. 4, in some embodiments, a thermally conductive gap pad 146 may be positioned between the heat sink 122 and the tool-side battery terminal(s) 110. More specifically, the thermally conductive gap pad 146 may be positioned between a bottom surface 130 of the heat sink 122 and at least one of the folded portions 118. The gap pad 146 may comprise any one or more thermally conductive material. For example, the gap pad 146 may comprise (e.g., be at least partially made from) silicone rubber. The gap pad 146 may provide surface contact area between the folded portion(s) 118 and the heat sink 122 such that the heat sink 122 can more effectively transmit heat away from the tool-side battery terminal(s) 110.

As best illustrated in FIG. 5, the heat sink fins 138 of the heat sink 122 may be oriented along the battery axis BA. Such an orientation may promote efficient heat transfer by forced convection from the heat sink fins 138 to the airflow AF1 generated by the motor fan 94. FIG. 5 further illustrates a temperature sensor 150 (e.g., a thermistor) configured to monitor a temperature of at least one of the heat sink 122 or the tool-side terminal block 114. In the illustrated embodiment, the temperature sensor 150 is positioned adjacent the top surface 134 of the heat sink 122. However, in other embodiments, the temperature sensor 150 may be positioned on an outer surface of the tool-side terminal block 114. In the illustrated embodiment, the temperature sensor 150 is positioned within an airflow channel 142 between adjacent heat sink fins 138 of the heat sink 122. However, the temperature sensor 150 may be otherwise positioned and configured to monitor a temperature of the heat sink 122.

The temperature sensor 150 is configured to electrically communicate with the PCBA 62 such that the PCBA 62 may determine and act upon sensed temperature data of the heat sink 122 and/or the terminal block 114. Data obtained by the temperature sensor 150 may be utilized by the PCBA 62 to indicate whether overcurrent/overheating exists between the battery terminals 48 of the battery pack 42 and the tool-side battery terminals 110 of the battery receptacle 50. The PCBA 62 may be programmed with any array of power-adjusting parameters to mitigate overheating, overcurrent, etc. For example, the PCBA 62 may be programmed to decrease current draw from the battery pack 42 in the event of mild overheating. Additionally or alternatively, the PCBA 62 may be programmed with an auto-shutoff feature which stops current draw from the battery pack 42 in the event of overheating above a threshold temperature.

In operation of the rotary hammer 10, the battery pack 42 is coupled to the rotary hammer 10 with the battery terminals 48 engaging the tool-side battery terminals 110 at the battery receptacle 50. The user selects a mode of operation of the rotary hammer 10 with the mode selection dial 74. Once a mode of operation is selected, the user may actuate the trigger 54 and thus the electrical switch 58. The switch 58 communicates with the PCBA 62 to draw current from the battery pack 42 to power the motor 18. Electrical current is directed from the battery pack 42 through the battery terminals 48 and the tool-side battery terminals 110 to activate the motor 18. The motor 18 and drive train 70 move the tool bit 30 in accordance with the selected mode of operation. During operation of the motor 18, heat is generated at the interface between the battery terminals 48 and the tool-side battery terminals 110. As the motor 18 rotates, the motor fan 94 generates the airflow AF1, and the airflow AF1 transfers heat away from the heat sink 122, and thus the tool-side battery terminals 110. The airflow AF1 at least partially cools the heat sink 122 by forced convection. Optionally, during operation of the motor 18, the temperature sensor 150 monitors a temperature of at least one of the heat sink 122 and the tool-side terminal block 114. The temperature sensor 150 provides a temperature input to the PCBA 62, which in turn operates the motor 18 as necessary to avoid overheating, overcurrent, etc. of the battery terminals 48 and the tool-side battery terminals 110.

Figure 6:
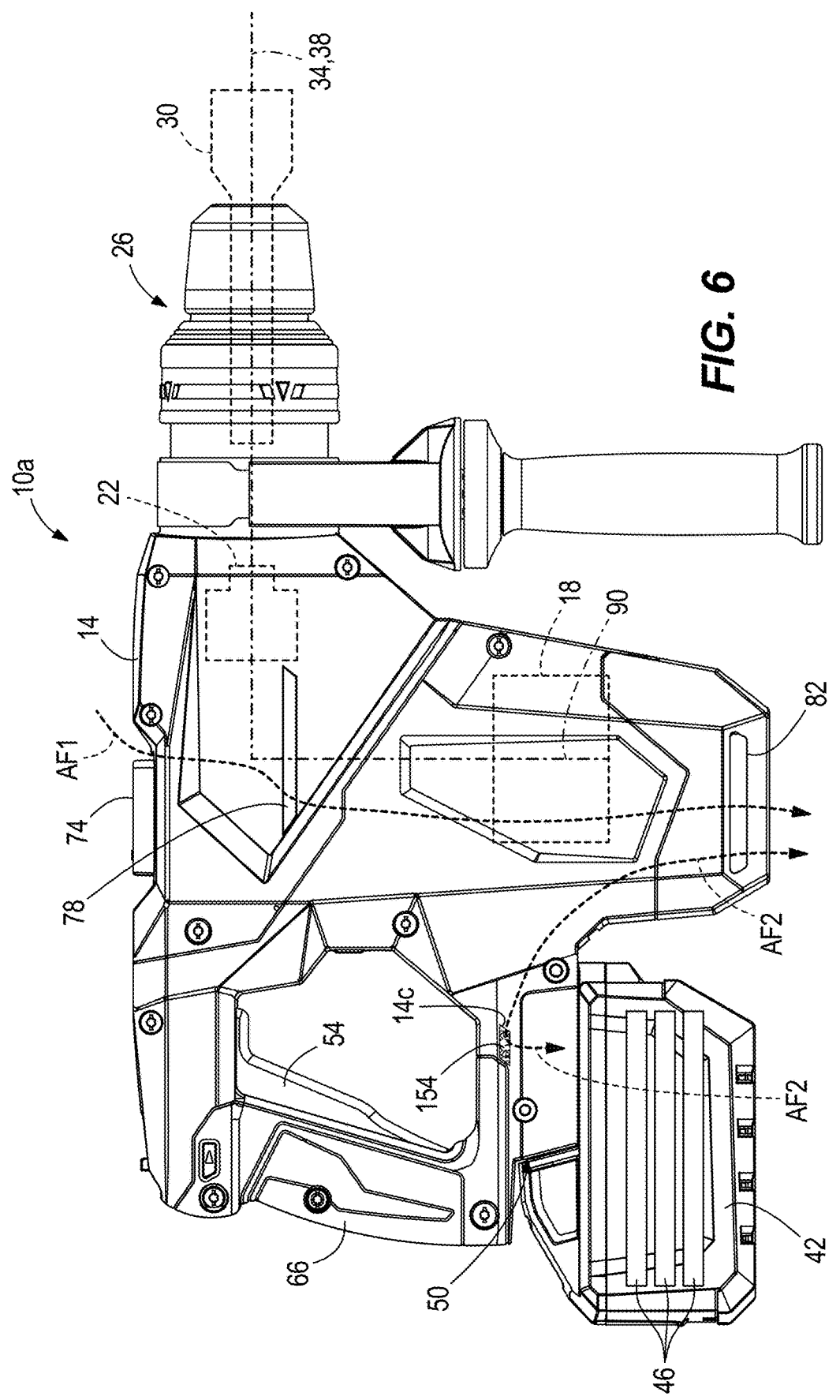
FIG. 6 is a side view of an alternative rotary hammer including a terminal block fan.
Figure 7:
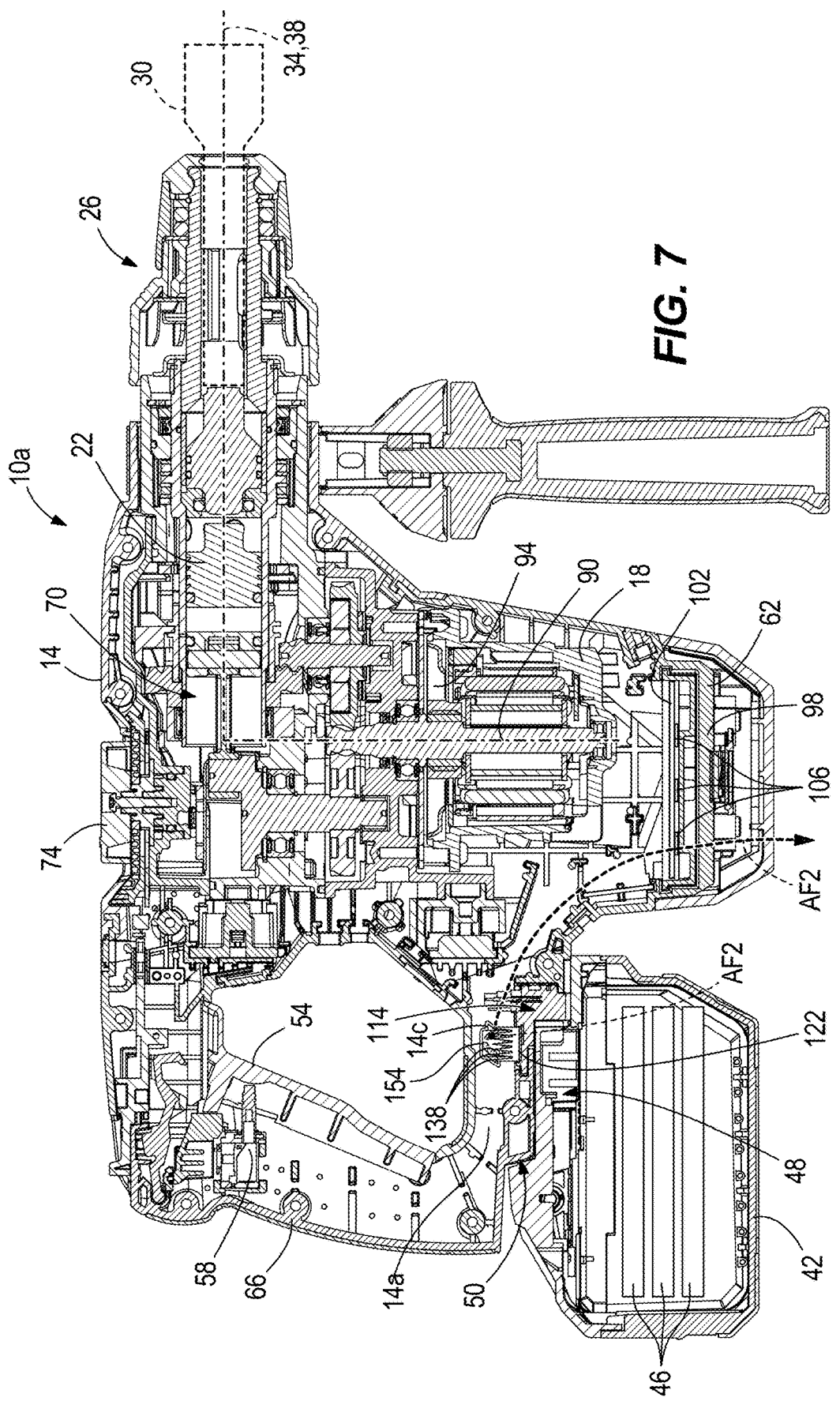
FIG. 7 is a longitudinal cross-sectional view of the rotary hammer of FIG. 6.
Figure 8:
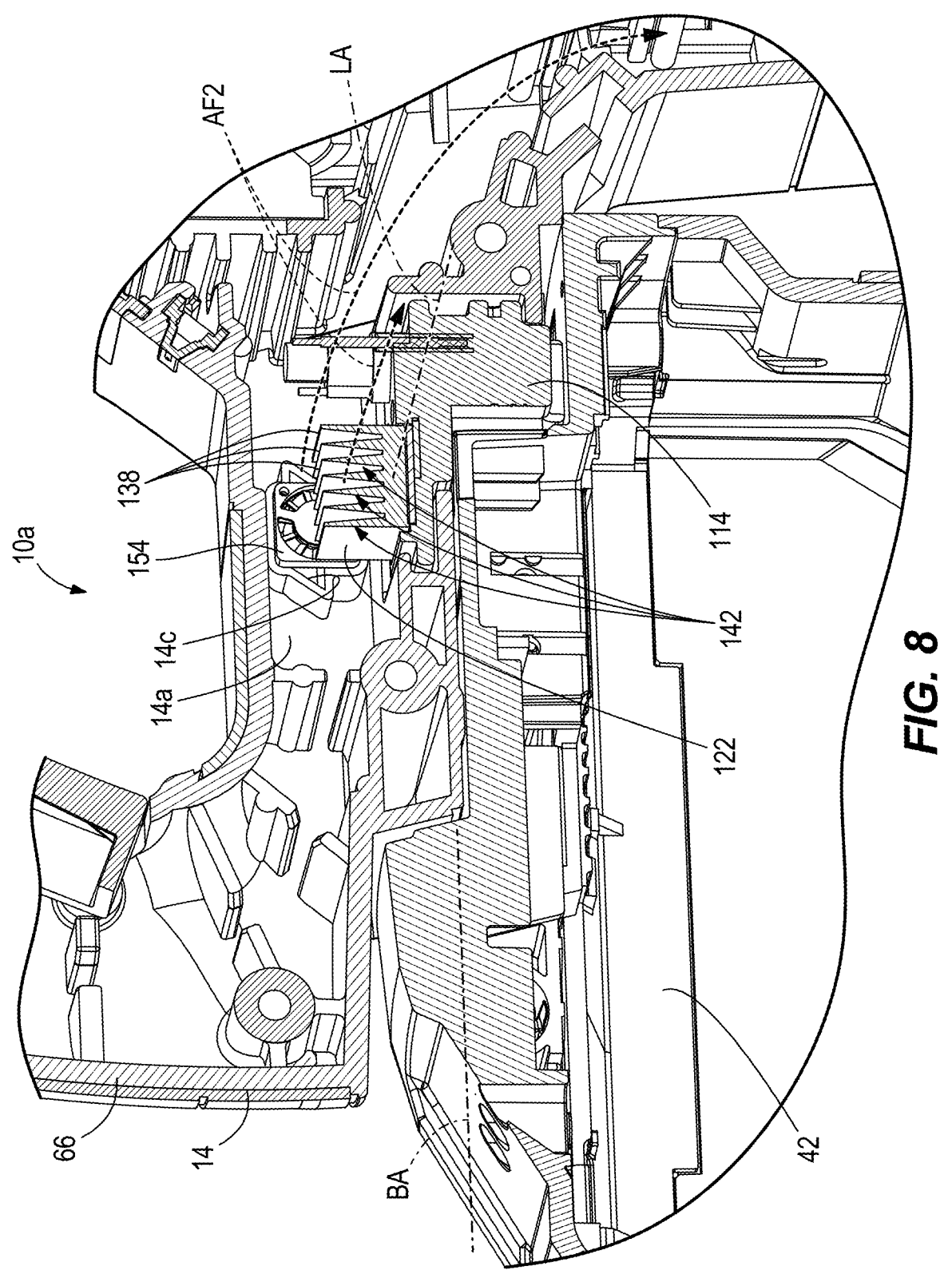
FIG. 8 is a perspective view of the rotary hammer of FIG. 6.

FIGS. 6-8 illustrate a similar rotary hammer 10*a* when compared to FIGS. 1-5. However, the rotary hammer 10*a* further includes a terminal block fan 154 separate from the motor fan 94. The terminal block fan 154 is positioned within the housing 14 and adjacent one of the side walls 14*a* of the housing 14. In the rotary hammer 10*a*, the housing 14 includes terminal block fan openings 14*c* in each of the lateral (i.e., left and right) sidewalls 14*a* of the housing 14 to optionally provide fluid communication with the surroundings of the rotary hammer 10*a* for a separate airflow path AF2 (e.g., a second airflow), configured to be created by the terminal block fan 154 to at least partially cool the heat sink 122 by forced convection. The second airflow path AF2 may be distinct from but converge with the airflow AF1 to cool the tool-side battery terminals 110 and/or the tool-side terminal block 114. In the illustrated embodiment, the terminal block fan openings 14*c* provide intake on one of the lateral sides of the rotary hammer 10 (e.g., the left side), and exhaust on the opposite lateral side of the rotary hammer 10. However, the terminal block fan openings 14*c* may be otherwise positioned on the housing 14 to provide at least one of an inlet opening or an exhaust opening (e.g., in addition to the inlet opening 78 and the exhaust openings 82) for the terminal block fan 154. In other embodiments, only one terminal block fan opening 14*c* may be provided. In still other embodiments, no additional terminal block fan openings 14*c* may be provided, and the inlet opening 78 and exhaust opening 82 may provide the only inlet and outlet to the housing 14.

The terminal block fan 154 may be electrically connected with the PCBA 62 to receive power from the battery pack 42 during operation of the motor 18. While operating, the terminal block fan 154 provides a dedicated forced convection airflow AF2 through the housing 14. The airflow AF2 generated by the terminal block fan 154 is directed in a direction along the heat sink fins 138 and to transmit heat from the heat sink fins 138 (and thus the battery terminals 48, tool-side battery terminals, and tool-side terminal block 114) to the airflow AF2. The airflow AF2 generated by the terminal block fan 154 may exit the housing 14 by the terminal block fan opening 14*c* opposite the terminal block fan 154. Alternatively, the airflow AF2 or a portion thereof, may converge with the airflow AF1 generated by the motor fan 94, and exit the housing 14 by either of the exhaust openings 82, 82*a*.

As best illustrated in FIG. 8, the terminal block fan 154 is oriented in a lateral orientation along a lateral axis LA which is perpendicular to the battery axis BA. In the illustrated embodiment, the heat sink fins 138 and corresponding airflow channels 142 are oriented along the lateral axis LA such that airflow generated by the terminal block fan 154 passes along the heat sink fins 138 in parallel with the lateral axis LA. The heat sink fins 138 are oriented in a lateral direction at least partially spanning opposite sidewalls 14*a* of the housing 14. Other different orientations of the terminal block fan 154 and the heat sink 122 are possible. Airflow generated by the terminal block fan 154 (e.g., second airflow) may be, downstream of the heat sink 122, reintroduced with airflow AF1 generated by the motor fan 94 for exhaust through the exhaust opening 82.

Although the invention has been described in detail with reference to certain preferred embodiments, variations and modifications exist within the scope and spirit of one or more independent aspects of the invention as described.

What is claimed is:

1. A power tool comprising:
   a housing; and
   a motor positioned in the housing and configured to drive a working element;
   the housing including a battery receptacle configured to receive a battery, the battery receptacle including
      a tool-side battery terminal electrically coupled to the motor and configured to transfer electrical current from the battery to the motor,
      a tool-side terminal block to which the tool-side battery terminal is mounted, and
      a heat sink positioned in the battery receptacle, the heat sink in thermal communication with at least one of the tool-side terminal block or the tool-side battery terminal, and the heat sink comprising a thermally conductive material configured to transfer heat away from the tool-side battery terminal.

2. The power tool of claim 1, wherein the heat sink includes a plurality of fins.

3. The power tool of claim 2, wherein the battery pack is configured to be coupled with the battery receptacle by relative translation of the battery pack along a battery axis, and wherein the fins are oriented parallel with the battery axis.

4. The power tool of claim 2, where the fins project from a top surface of the heat sink, and wherein the fins are extrusions having a tapered cross-sectional shape.

5. The power tool of claim 1, further comprising a thermally conductive gap pad positioned between and in thermal communication with the tool-side battery terminal and the heat sink.

6. The power tool of claim 5, wherein the gap pad is at least partially made from silicone rubber.

7. The power tool of claim 1, further comprising a motor fan driven by the motor when the motor is activated to generate a first airflow which at least partially cools the heat sink by forced convection.

8. The power tool of claim 7, further comprising a terminal block fan separate from the motor fan, wherein the terminal block fan is configured to provide a second airflow which at least partially cools the heat sink by forced convection.

9. The power tool of claim 8, wherein the heat sink further includes a plurality of heat sink fins, and wherein the second airflow created by the terminal block fan is directed in a direction along the heat sink fins.

10. The power tool of claim 9, wherein the housing defines a first opening on a first lateral side of the housing and a second opening on a second lateral side of the housing that is opposite the first side, the first opening being an inlet for the terminal block fan and the second opening being an outlet for the terminal block fan.

11. The power tool of claim 1, wherein the heat sink further includes a plurality of heat sink fins oriented in a lateral direction at least partially spanning opposite sidewalls of the housing.

12. The power tool of claim 1, further comprising a sensor configured to monitor a temperature of at least one of the heat sink or the tool-side terminal block.

13. The power tool of claim 12, wherein the sensor is a thermistor in thermal communication with at least one of the heat sink or the tool-side terminal block.

14. The power tool of claim 13, wherein the heat sink includes a plurality of heat sink fins, and wherein the thermistor is positioned between adjacent heat sink fins.

15. The power tool of claim 1, wherein the heat sink is at least partially made from Aluminum.

16. The power tool of claim 1, wherein the heat sink is at least partially made from Copper.

17. The power tool of claim 1, wherein the power tool is a rotary hammer and the motor is coupled with a drive train configured to operate in at least two of the following modes:
   a combined hammer and drilling mode in which the working element is rotated and axially reciprocated;
   a hammer-only mode in which the working element is only axially reciprocated;
   a drill-only mode in which the working element is only rotated; and
   a chisel adjustment mode in which the working element is axially reciprocated and rotatable to adjust an orientation of the working element.

18. The power tool of claim 1, wherein the tool-side battery terminal includes a folded portion that is folded in a laterally inward direction towards a center of the tool-side terminal block.

19. The power tool of claim 18, wherein the folded portion is in thermal communication with the heat sink.

20. The power tool of claim 18, wherein the tool-side battery terminal is a first tool-side battery terminal, and wherein the power tool further comprises a second tool-side battery terminal including a second folded portion that is folded in a laterally inward direction towards the center of the tool-side terminal block and towards the folded portion of the first tool-side battery terminal.

21. The power tool of claim 18, wherein the terminal block is made of an electrically insulative material.

* * * * *